May 31, 1932.  E. G. GRINHAM  1,861,387

CHANGE SPEED GEAR MECHANISM

Filed May 9, 1930   2 Sheets-Sheet 1

Inventor:
Edward George Grinham,
By Mawhinney & Mawhinney,
Attys.

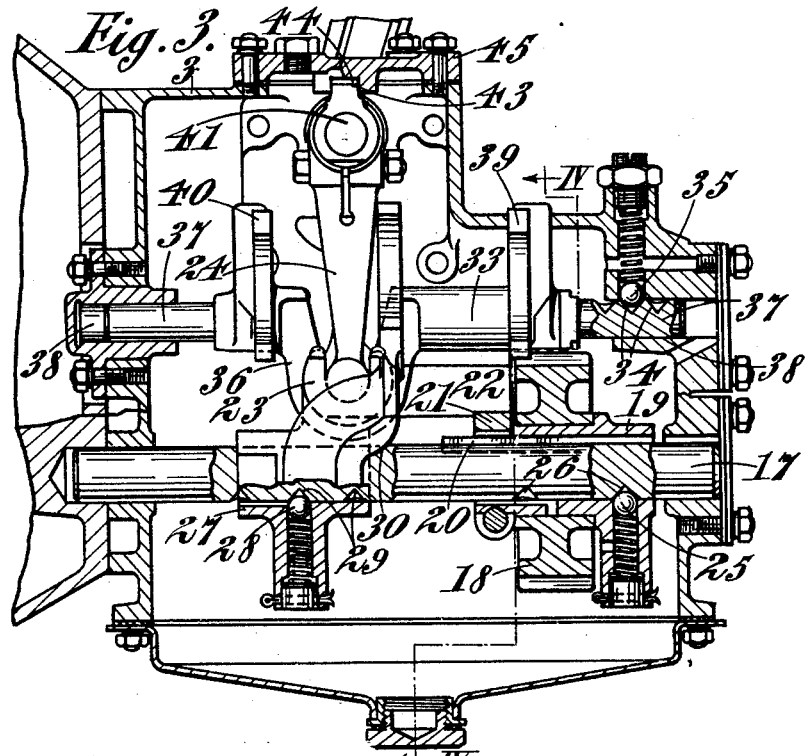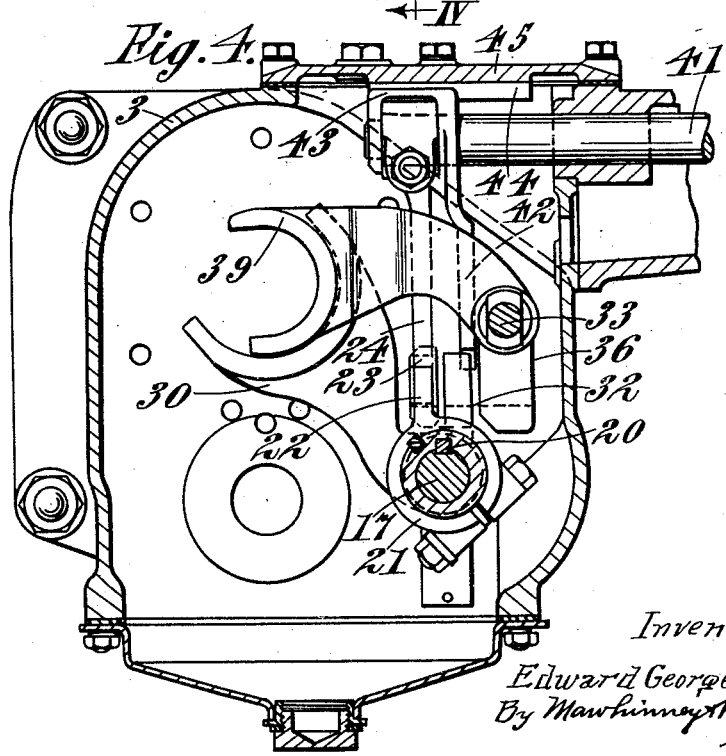

Patented May 31, 1932

1,861,387

UNITED STATES PATENT OFFICE

EDWARD GEORGE GRINHAM, OF COVENTRY, ENGLAND, ASSIGNOR TO HUMBER LIMITED, OF COVENTRY, ENGLAND

CHANGE SPEED GEAR MECHANISM

Application filed May 9, 1930, Serial No. 451,041, and in Great Britain May 10, 1929.

This invention relates to change-speed gear mechanism, chiefly for use on motor vehicles, of the kind wherein there are coaxial driving and driven shafts adapted to be clutched together by a sliding member to provide a direct drive, and a layshaft constantly driven at one end from the driving shaft and having fixed at its other end a gear wheel in constant mesh with a gear wheel free on the driven shaft but clutchable thereto by a sliding member to provide an indirect drive.

The object of the invention is to provide a simple construction with improved mounting for the sliding gear wheel (or gear wheels) which can be connected with a gear wheel (or wheels) fixed on the layshaft to give a further indirect drive (or drives), and to provide simplified operating mechanism.

According to this invention, the sliding gear wheel (or gear wheels) is independent of the sliding clutch members and located between them directly upon a non-circular part of the driven shaft. These sliding clutch members may be entirely independently controlled or they may be interconnected by their operating mechanism so as to move in unison. With this arrangement the gear box can be very compact and quiet operation on the further indirect drive is easy to obtain.

In the accompanying drawings, which illustrate the preferred method of carrying out the invention, Figure 1 is a longitudinal vertical section through the driving and driven shafts and the layshaft of a four-spaced box adapted to according to the invention.

Figure 3 is a longitudinal vertical section taken mainly on the line III—III of Figure 2, Figure 4 is a transverse vertical section taken mainly on the line IV—IV of Figure 3, but with certain parts omitted.

Like reference numerals denote like parts throughout the drawings.

Figure 1:
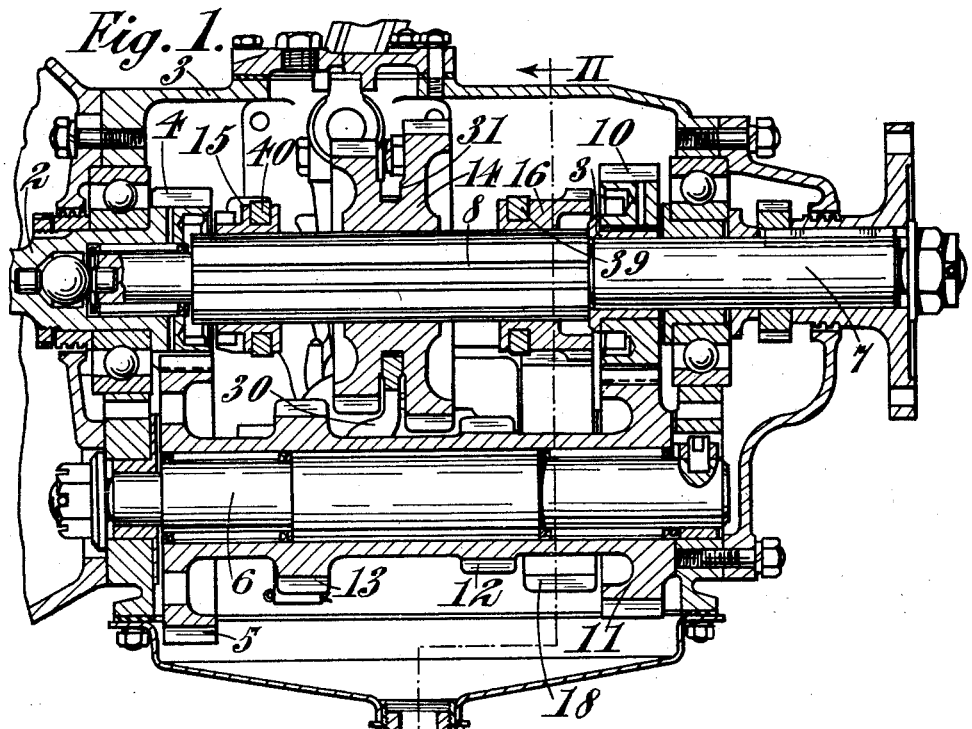
Figure 2:
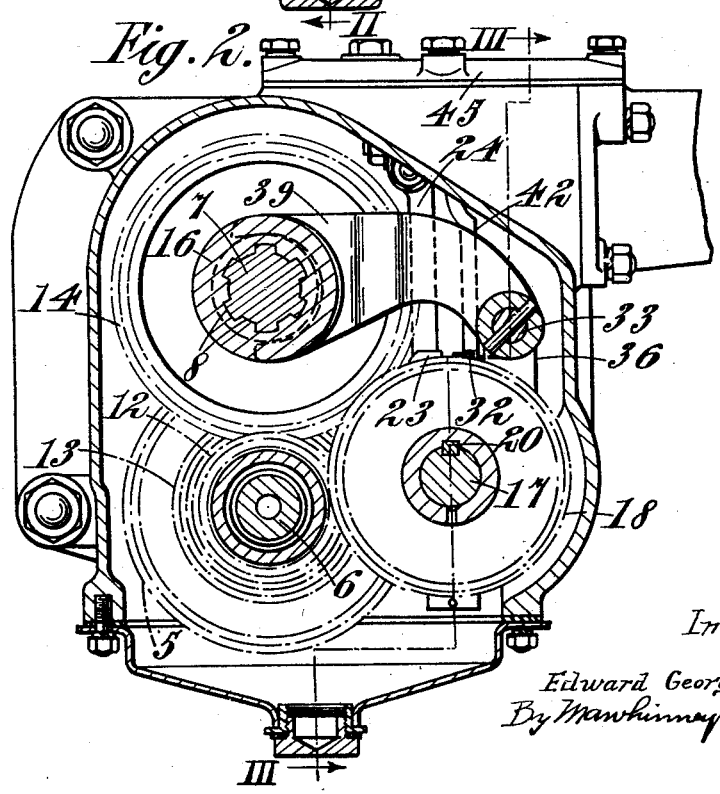
Figure 2 is a transverse vertical section taken on the line II—II of Figure 1.

In the gear-box illustrated, the change-speed gear mechanism comprises the usual driving shaft 2 which just enters the gear-box 3 and terminates in a pinion 4 which forms one of the constant mesh gears and is in permanent mesh with a wheel 5 on a layshaft 6, the axis of which is parallel to that of the driving shaft. The driven shaft 7 is coaxial with the driving shaft and for the greater part of its length it is splined as at 8, but at the extreme rear end it is provided with a bearing 9 upon which runs the third-speed gear wheel 10. This meshes at all times with a wheel 11 fixed to the layshaft. The layshaft, between this wheel 11 and the constant mesh wheel 5, has fixed to it the usual small gear wheels 12 and 13 used, respectively, for the further indirect drives, i. e., for the first and second speeds. These are adapted to be engaged by a compound gear wheel 14 free to slide but not to rotate on the splined driven shaft.

Between the compound gear wheel 14 and the constant mesh pinion 4 is a sliding dog clutch member 15 which is used for fourth speed or direct drive and locks the constant mesh pinion 4 on the driving shaft with the driven shaft. On the other side of the compound gear wheel is a second dog clutch member 16 adapted to lock the third-speed driven wheel 10 to the driven shaft. When so locked the power passes from the driving shaft through the constant mesh wheels 4 and 5, along the layshaft 6, and to the driven shaft through the third-speed gears 11 and 10. As the constant mesh wheels and the third-speed wheels do not slide, they can be made either of very fine pitch or with helical teeth (or both), so that very quiet running can be obtained in the well known manner.

As the compound gear wheel 14 used for first and second gears is mounted directly on the driven shaft, there is simplification in manufacture, and accuracy of mesh of these gears can be assured.

Arranged parallel with the gear shafts are two shafts carrying the striking forks for engaging the various sliding clutches and gears, and these shafts are formed with, or carry, the usual selector forks or jaws, adapted to be engaged by an arm on, or connected with, the change-speed lever.

Preferably the arrangement is as follows: The lower shaft 17 is a fixture in the gear box and upon it slides the reverse gear wheel 18 which is mounted freely upon a sleeve 19 working on a key 20 or splines on the shaft. The sleeve has attached to it a fork member 21 with a lateral arm 22 terminating in a jaw 23, the mouth of which is uppermost. This jaw constitutes the selector for the reverse gear wheel, and when engaged by the arm 24 moved by the change-speed lever the reverse wheel is moved sideways in the well known manner. The sleeve upon which the reverse wheel runs carries a spring plunger 25 or the equivalent which is adapted to co-operate with a pair of notches 26, 26 on the shaft.

The shaft carries a second sliding sleeve 27 with a spring plunger 28 or the equivalent adapted to engage three notches 29, 29 in the fixed shaft. This second sleeve is formed with a fork 30 which extends upwards at about 45 degrees and engages a groove 31 in the middle of the compound gear wheel. This second sleeve also has an upstanding jaw 32 which lies alongside that for the reverse gear wheel and can be engaged by the arm 24. Thus the lower shaft 17 carries the striking forks for the first and second compound gear and for the reverse pinion.

The upper shaft 33 is free to slide and is formed with three notches 34, 34 engaged by a spring plunger 35 or the equivalent, and near the centre this shaft is bent downwards to form a jaw 36 which lies alongside that of the first and second gear selector. The shaft may be constructed of a bronze casting of the required shape with attached hardened steel end pieces 37, 37 which slide in sockets 38, 38 in the gear box.

The bronze casting carries two forks, one 39 engaging the third-speed sliding dog clutch 16 and the other 40 the fourth-speed sliding dog clutch 15.

Thus all the striking forks are mounted about only two centres, the axes of the two shafts referred to, and then arranged in such a manner that a central change speed lever can be fitted if required.

Preferably the arm 24 which engages the selector jaws or forks is carried upon a spindle 41 which slides transversely to the gear box to engage the arm with the various selectors and twists to effect change of gear. The spindle also carries a locking finger 42 which hangs down beside the arm 24 and is adapted to enter the selector jaw 32 for the first and second gears whilst the arm is in the reverse selector. This finger has a part 43 which projects above the spindle and engages a groove 44 in the gear-box lid 45 so that it cannot twist. In this way accidental movement of the first and second compound gear is prevented whilst the reverse gear is being moved.

By the invention a very compact gear-box, giving four forward speeds of which two are "silent" speeds, is provided, and the pinions through which the other speeds are taken are mounted directly on their respective shafts, and not on a sliding sleeve thereon.

What I claim as my invention and desire to secure by Letters Patent of the United States is:—

In a change-speed gear mechanism, the combination of coaxial driving and driven shafts, a splined portion on said driven shaft, sliding members on the ends of said splined portion, one of said sliding members acting to directly clutch said driving shaft to said driven shaft, a gear wheel free on said driven shaft at the other end of said splined portion, the other of said sliding members acting to directly clutch said gear wheel to said driven shaft, means for continuously driving said gear wheel from said driving shaft, said means including a continuously-driven gear wheel, a sliding gear wheel on said splined portion intermediate and independent of said sliding clutch members, said sliding gear wheel being slidable into and out of mesh with said continuously-driven gear wheel, and rigid forked means passing outside said sliding gear wheel and interconnecting said sliding clutch members to ensure movement thereof in unison, said rigid forked means comprising an axially slidable shaft bent downwards intermediate its ends to form a selector jaw.

In testimony whereof I affix my signature.

EDWARD GEORGE GRINHAM.